Jan. 10, 1961
F. I. STEWART
2,967,605
CONVEYOR
Filed Aug. 13, 1959
3 Sheets-Sheet 1
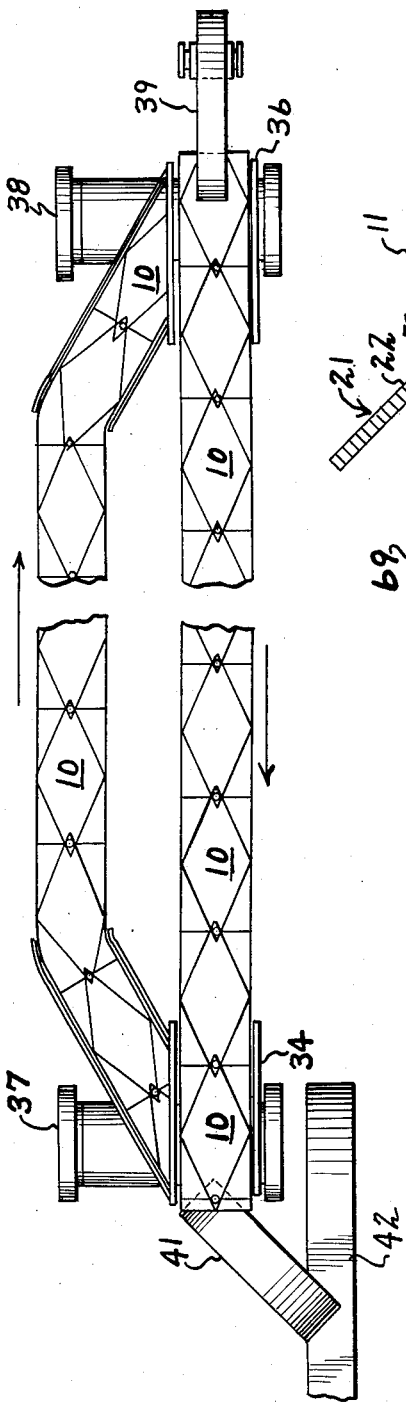
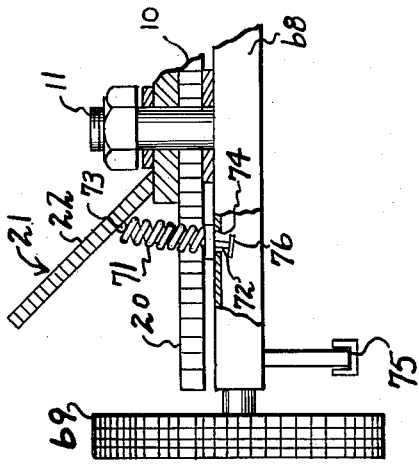
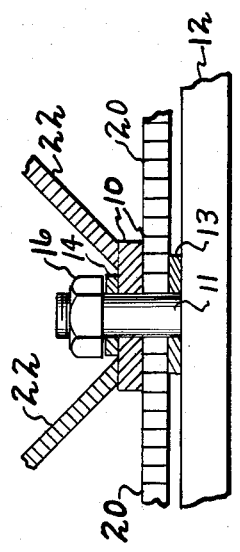
INVENTOR.
Felix I. Stewart
BY Jennings, Carter & Thompson
Attorneys

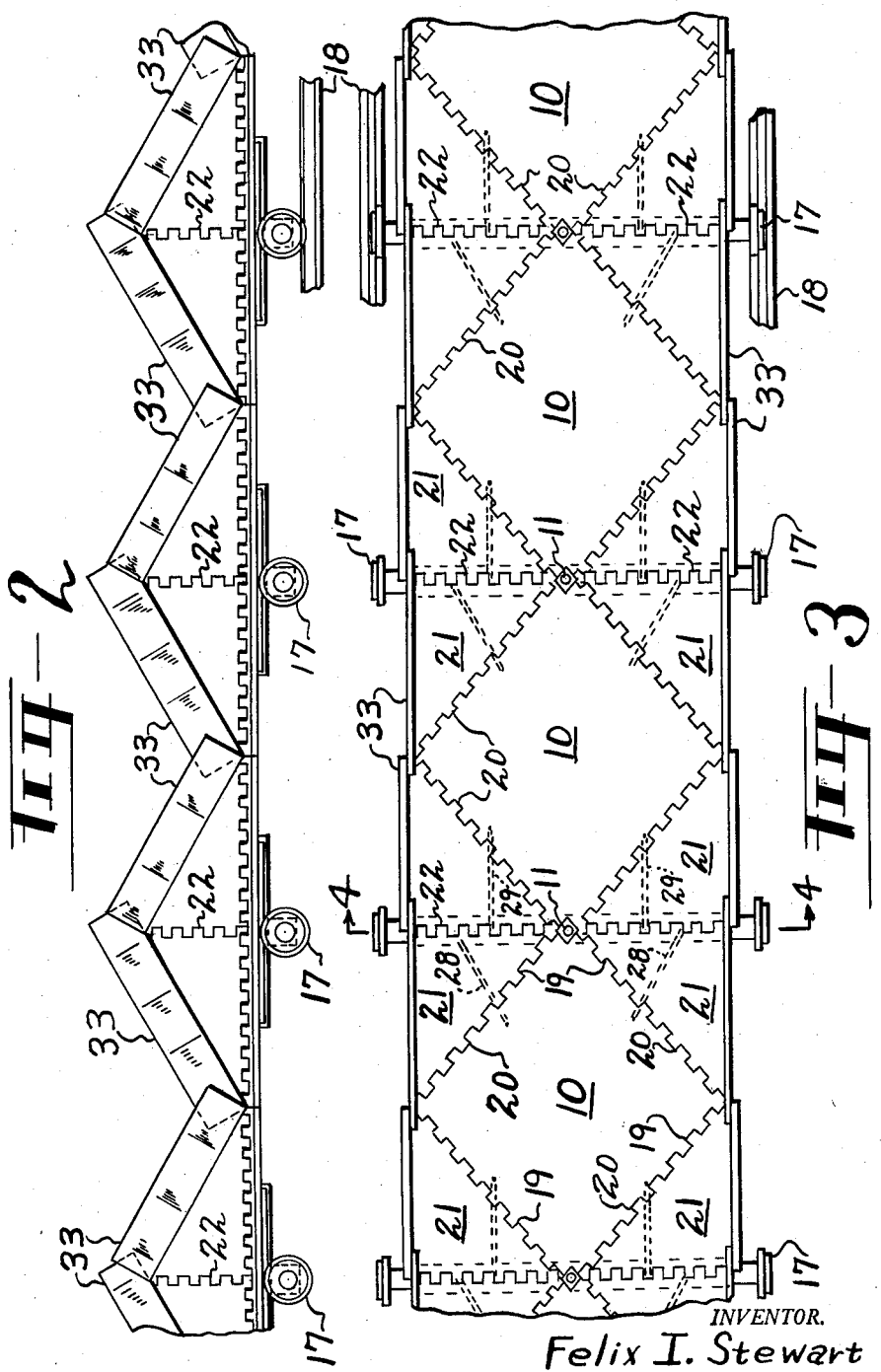

Jan. 10, 1961    F. I. STEWART    2,967,605
CONVEYOR
Filed Aug. 13, 1959    3 Sheets-Sheet 3
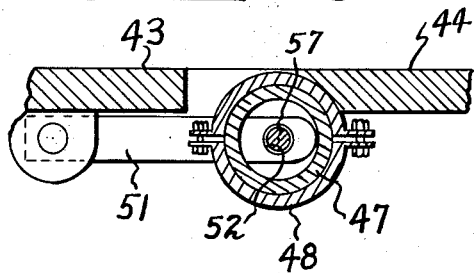
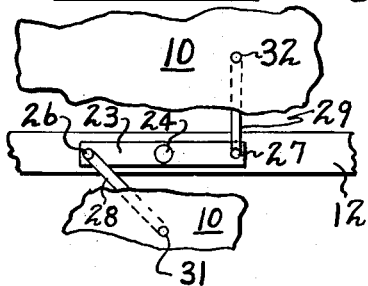
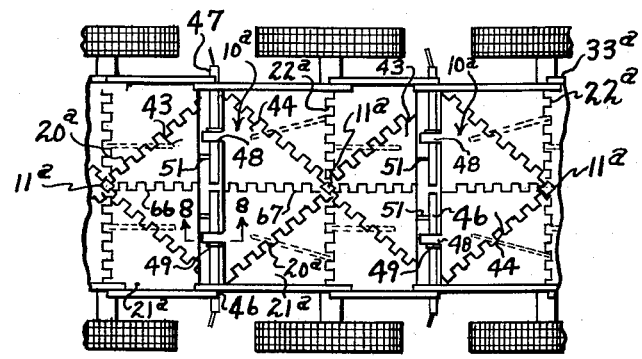
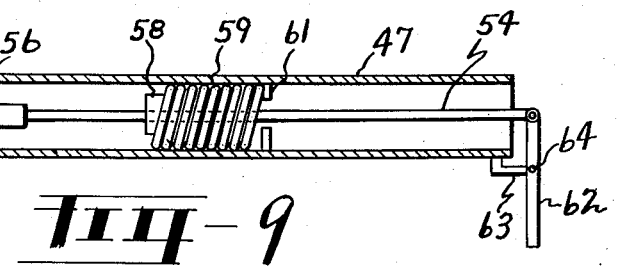
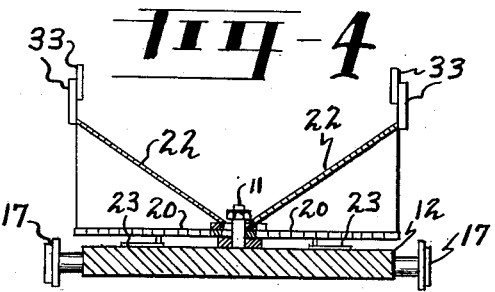
INVENTOR.
Felix I. Stewart
BY Jennings, Carter & Thompson
Attorneys

United States Patent Office 2,967,605
Patented Jan. 10, 1961

2,967,605
CONVEYOR
Felix I. Stewart, 121 Earle St., Huntsville, Ala.
Filed Aug. 13, 1959, Ser. No. 833,430
14 Claims. (Cl. 198—181)

This invention relates to conveyor apparatus and more particularly to a conveyor which shall be adapted for conveying materials over irregular paths and around curves and the like.

An object of my invention is to provide conveying apparatus which shall embody a plurality of conveying sections which are hingedly connected to each other whereby the conveyor is adapted to accommodate itself to the contour of the path over which the conveyor travels.

A more specific object of my invention is to provide conveying apparatus of the character designated which shall embody a plurality of material supporting sections pivotally connected to each other in tandem relationship, together with other supporting sections hingedly connected to the first mentioned material supporting sections and to each other, whereby the sections are adapted for pivotal movement relative to each other as the conveyor passes over irregular paths and around curves.

Another object of my invention is to provide conveying apparatus of the character designated in which conveying sections may be added or removed from the conveyor, thereby making the conveyor extensible.

A still further object of my invention is to provide conveying apparatus of the character designated which shall be simple of construction, economical of manufacture and which may be readily assembled and disassembled with a minimum of labor.

Heretofore in the art to which my invention relates, various forms of flexible conveyors have been devised. However, so far as I am aware, such conveyors are required to be formed of flexible materials which require considerable sub-supports therefor. Also, such flexible conveyors have been formed of expensive materials, such as reinforced synthetic rubbers and the like, which require auxiliary means for flexing the conveyor over irregular paths and around curves as well as auxiliary means for holding the sides of the conveyor in material supporting position.

To overcome the above and other difficulties, I provide a conveyor which is adapted to travel around curves or over irregular paths without any auxiliary means for holding the material forming sections of the conveyor in proper position. Also, I provide improved means for detachably connecting adjacent sections of the conveyor to each other whereby the conveyor is extensible.

Apparatus embodying features of my invention is illustrated in the accompanying drawings, forming a part of this application, in which:

Fig. 1 is a plan view of my conveyor showing one form of end terminal which may be employed;

Fig. 2 is a side elevational view, partly broken away, showing the conveyor in position for conveying materials along a generally straight line of travel;

Fig. 3 is a plan view of the apparatus shown in Fig. 2;

Fig. 4 is a sectional view taken generally along the line 4—4 of Fig. 3;

Fig. 5 is an enlarged fragmental view showing the pivotal connection between the material supporting sections;

Fig. 6 is an enlarged, fragmental view showing the means for maintaining the supporting axles in proper position;

Fig. 7 is a plan view, partly broken away, showing a modified form of my invention;

Fig. 8 is an enlarged sectional view taken generally along the line 8—8 of Fig. 7;

Fig. 9 is a horizontal sectional view through the means for detachably connecting adjacent ones of the sections to each other; and, Fig. 10 is an enlarged elevational view, partly broken away and in section, showing a further modified form of my invention.

Referring now to the drawings for a better understanding of my invention, I show a plurality of material supporting sections 10 pivotally connected to each other in tandem relationship by pivot pins 11 which are carried by supporting axle members 12. The material supporting sections are held in assembled position by suitable washers 13 and 14 and a nut 16, as shown in Fig. 5. Mounted at each end of the axle members 12 are suitable supporting wheels 17 which may have flanges thereon for riding on supporting rails 18. However, it will be apparent that the supporting wheels could be of various types, such as pneumatic tires, whereby the conveyor is adapted for moving over trackless surfaces.

The sides of the material supporting sections 10 taper inwardly toward the ends of the material supporting sections, as at 19. Preferably, the sections 10 are of a diamond-shape, as shown, whereby a maximum amount of flexing is provided. However, the material supporting sections 10 could be generally rectangular in shape and have inwardly tapered end portions 19.

Hingedly connected to the inwardly tapered end portions 19 of the material supporting sections 10 by suitable hinges 20 are other sections 21 which are preferably triangular in shape, as shown in Fig. 3. The adjacent or abutting edges of the sections 21 are hingedly connected to each other by suitable hinges 22 whereby the sections 21 are adapted for pivotal movement relative to each other.

In order to allow for the hinges 22 to move to a generally horizontal lower position, the hinges 22 are inclined upwardly and outwardly toward the sides of the conveyor, as shown in Fig. 2. Accordingly, upon making a turn, the hinges 22 assume a horizontal position when that side of the apparatus is on the outside of the curve being made. On the other hand, the hinges 22 are raised from the position shown in Fig. 2 when that side of the apparatus is on the inside of the curve. That is to say, the hinges 22 at one side of the apparatus are raised while the hinges at the other side thereof are lowered upon movement of the conveyor around a curve.

To hold the axle members 12 in proper relation to the material supporting sections 10, I provide link connections between the axle and the material supporting sections 10, as clearly shown in Fig. 6. The link connection comprises a link 23 pivotally connected to the axle by a pivot pin 24. Pivotally connected to opposite ends of the link 23 by suitable pivot pins 26 and 27 are auxiliary link members 28 and 29, respectively. The other ends of the link members 28 and 29 are pivotally connected by pivot pins 31 and 32 to the adjacent material supporting sections 10. Accordingly, as the conveyor passes around curves, the axle 12 is maintained in the proper relation relative to the adjacent sections 10.

To prevent spillage of the materials being conveyed by the conveyor, suitable side members 33 may be secured to the outer edges of the sections 21, as clearly shown in Figs. 2 and 3. The side members 33 overlap each other, as shown, whereby there is no gap between the adjacent ends of the side members 33 as the conveyor passes around curves.

In Fig. 1 of the drawings, I show the conveyor as passing around end terminals 34 and 36, the terminal 34 being a discharge terminal and the terminal 36 being a receiving terminal. The terminals 34 and 36 are supported by suitable mobile units 37 and 38, respectively, whereby the conveyor apparatus may be extensible and adapted for movement from place to place. Material is loaded onto the conveyor by a suitable loader indicated generally at 39. The material discharged at the terminal 34 is received by an auxiliary conveyor 41 which in turn transfers the material to a second conveyor 42 or other suitable receptacle therefor.

In Fig. 7 of the drawings I show a modified form of my invention which comprises material supporting sections 10ª which are pivotally connected to each other in tandem relationship by suitable pivot pins 11ª. Each material supporting section 10ª is divided transversely into sub-sections 43 and 44 which are detachably connected to each other by a suitable hinge member indicated generally at 46. Each hinge member 46 comprises a tubular member 47 which is mounted in suitable bearings 48 carried by the subsection 44. Axial movement of the tubular member 47 relative to the bearing members 48 is limited by suitable collars 49 which are mounted on the tubular members 47, as shown in Fig. 7.

Attached to the under surface of the sub-section 43 are outwardly projecting members 51 having transverse openings 52 therein. Suitable openings 53 are provided in the tubular member 47 for receiving the free end of the projections 51, as shown in Fig. 9. Mounted for axial movement within the tubular member 47 is an elongated actuating member 54 which rides in suitable bearings 56, as shown. A locking member 57 is mounted adjacent the free end of the actuating member 54 in position to move in the opening 52, as shown in Fig. 8, when the sub-sections 43 and 44 are moved into connected relationship relative to each other. Mounted on the elongated actuating members 54 is a spring abutment 58 which is in position to engage one end of a compression spring 59. The other end of the compression spring 59 engages a suitable spring abutment 61 carried by the inner surface of the tubular member 47.

The actuating member 54 is moved axially of the tubular member 47 by a suitable operating handle 62 which is pivotally connected to a supporting bracket 63 by a pivot pin 64. Accordingly, to release the projections 51 from the latch members 57, the operating handle 62 is moved whereby the locking member 57 is removed from the opening 52, whereupon the sub-sections 43 and 44 may be separated from each other for inserting other sections or removing sections from the conveyor apparatus.

As shown in Fig. 7, the sub-sections 43 and 44 are divided longitudinally by hinge members 66 and 67, respectively. By providing the hinge members 66 and 67, the material supporting sections have more flexibility in that the sections of the sub-sections which are connected by the hinges 66 and 67 are adapted for pivotal movement relative to each other.

Hingedly connected to the inwardly tapered end portions of the material supporting sections 10ª by suitable hinges 20ª are other sections 21ª which are preferably triangular in shape. The sections 21ª and hingedly connected to each other by suitable hinges 22ª, as shown. Also side members 33ª may be secured to the sections 21ª to aid in retaining the materials being conveyed on the conveyor.

In Fig. 10 of the drawings I show a further modified form of my invention which comprises a channel shaped axle member 68 supported by wheels 69. Supported by the axle members 68 are material supporting sections 10 which are identical to the sections 10 described herein-above. That is, the sections 10 are connected to each other by pivot pins 11. Hingedly connected to the material supporting sections 10 by hinges 20 are other sections 21 which are triangular in shape as described above. The adjacent abutting edges of the sections 21 are hingedly connected to each other by suitable hinges 22 whereby the sections are adapted for pivotal movement relative to each other.

In order to counterbalance the weight of the materials carried by the sections 21, whereby the sections at one side of the conveyor readily move to raised position upon making a curve, I mount a compression spring 71 between the axle member 68 and the hinge connection 22. Also, the spring 71 assists in moving the hinge connection 22 at the other side of the conveyor toward raised position after the conveyor has passed around a curve, whereby the sections 21 of the conveyor readily move to normal position. It will be apparent that more pressure is exerted by the spring 71 while it is compressed whereby more force is applied to raise the hinge connection to normal load carrying position that is applied to raise the sections 21 above normal load carrying position. It will be apparent that other resilient means may be interposed between the sections 21 and the supporting means, such as shock absorbers and the like.

The spring 71 is held in position by a rod 72 which is pivotally connected to the hinge connection 22 by a suitable pivot pin 73. The lower end of the rod 72 passes freely through an opening 74 provided in the axle 68. To limit upward movement of the rod 72, an enlarged abutment 76 is provided adjacent the lower end of the rod 72 in position to engage the axle 68, as shown. Projecting downwardly from the axle 68 are guide members 75 which are adapted to engage a suitable guideway whereby the apparatus may be directed around curves.

From the foregoing, it will be seen that I have devised an improved conveyor which is adapted for conveying materials over irregular surfaces and around curves. By providing relatively rigid material supporting sections and hingedly connecting the sections to each other, the material supporting sections remain in proper relation relative to each other regardless of whether the material is being conveyed in a straight line or is being conveyed around a curve. Accordingly, the only support needed for the conveyor apparatus is the axle supports at intervals. Also, by providing means for detachably connecting the sections to each other, sections may be added or removed from the conveyor at will whereby the conveyor is extensible. By providing the quick means for detachably connecting the sections to each other, the sections may be added or deleted from the conveyor while the conveyor is still running. This can be accomplished by various means, such as by providing a side track for removing sections or a side track for holding the sections to be added.

While I have shown by invention in several forms, it will be obvious to those skilled in the art that it is not so limited but is susceptible of various other changes and modifications without departing from the spirit thereof and I desire, therefore, that only such limitations be placed thereupon as are specifically set forth in the appended claims.

What I claim is:

1. A conveyor comprising a plurality of material supporting sections, means pivotally connecting said sections to each other in tandem relationship, said material supporting sections having side portions which taper toward the ends of said material supporting sections, other sections hingedly connected along their inner edges to the tapered side portions of said material supporting sections, means hingedly connecting adjacent ones of other sections to each other, and means translatably supporting said material supporting sections.

2. A conveyor as defined in claim 1 in which said other sections hingedly connected to the material supporting sections are triangular in shape.

3. A conveyor as defined in claim 1 in which the material supporting sections are of a diamond shape as viewed in plan.

4. A conveyor as defined in claim 1 in which adjacent material supporting sections are pivotally connected to a transverse axle having supporting wheels.

5. A conveyor as defined in claim 4 in which the transverse axle is pivotally connected to the material supporting sections by link members at points removed from the pivotal connection between said material supporting sections, whereby pivotal movement of said axle relative to said supporting sections is limited.

6. A conveyor as defined in claim 1 in which each material supporting section is divided into at least two sub-sections which are hingedly connected to each other whereby said sub-sections are adapted for pivotal movement relative to each other.

7. A conveyor as defined in claim 6 in which each of said sub-sections is divided into at least two sections which are hingedly connected to each other.

8. A conveyor as defined in claim 1 in which upstanding side members are mounted at the outer edges of said other sections whereby material conveyed by said conveyor is retained thereon.

9. A conveyor as defined in claim 1 in which the pivotally connected material supporting sections define an endless conveyor having end terminals which are movable relative to each other, whereby the conveyor is extensible.

10. A conveyor as defined in claim 1 in which resilient means is interposed between said other sections and the means translatably supporting the material supporting sections.

11. A conveyor as defined in claim 10 in which the resilient means is a compression spring.

12. A conveyor comprising a plurality of material supporting sections, means pivotally connecting said sections to each other in tandem relationship, said material supporting sections having side portions which taper toward the ends of said material supporting sections, other sections hingedly connected along their inner edges to the tapered side portions of said material supporting sections, means hingedly connecting adjacent ones of said other sections to each other, said material supporting sections being divided transversely into separate sub-sections, a hinge assembly detachably connecting said sub-sections to each other, whereby said material supporting sections can be added and removed to vary the length of the conveyor, and means translatably supporting said material supporting sections.

13. A conveyor as defined in claim 12 in which the hinge assembly comprises a tubular member supported by one of said sub-sections, projections carried by the other of said sub-sections, there being openings through said tubular member for receiving said projections, and locking means within said tubular member for detachably connecting said projections to said tubular member.

14. A conveyor as defined in claim 13 in which the projections are locked to the tubular member by an elongated actuating member mounted for longitudinal movement within said tubular member, there being openings through said projections for receiving said actuating member.

References Cited in the file of this patent

UNITED STATES PATENTS 2,627,339   Whiting _____ Feb. 3, 1953